(12) United States Patent
Fujii

(10) Patent No.: US 11,714,525 B2
(45) Date of Patent: Aug. 1, 2023

(54) INFORMATION PROCESSING DEVICE, INFORMATION PROCESSING METHOD, AND COMPUTER PROGRAM

(71) Applicant: SONY INTERACTIVE ENTERTAINMENT INC., Tokyo (JP)

(72) Inventor: Takahiro Fujii, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 45 days.

(21) Appl. No.: 17/437,924

(22) PCT Filed: Mar. 5, 2020

(86) PCT No.: PCT/JP2020/009404
§ 371 (c)(1),
(2) Date: Sep. 10, 2021

(87) PCT Pub. No.: WO2020/184375
PCT Pub. Date: Sep. 17, 2020

(65) Prior Publication Data
US 2022/0129120 A1 Apr. 28, 2022

(30) Foreign Application Priority Data
Mar. 12, 2019 (JP) .................... 2019-044815

(51) Int. Cl.
*G06F 3/0482* (2013.01)
*A63F 13/53* (2014.01)

(52) U.S. Cl.
CPC ............ *G06F 3/0482* (2013.01); *A63F 13/53* (2014.09)

(58) Field of Classification Search
CPC .... G06F 3/0482; G06F 3/04817; A63F 13/53; A63F 13/85; H04N 21/472; H04N 21/482
See application file for complete search history.

(56) References Cited

U.S. PATENT DOCUMENTS 9,364,743 B2 * 6/2016 Miura .................... A63F 13/69
10,028,007 B2 * 7/2018 Arriola ................ G06F 16/904
2010/0077353 A1 * 3/2010 Moon ..................... G06F 16/64
715/810

(Continued)

FOREIGN PATENT DOCUMENTS

JP     2006158956 A     6/2006
JP     2011217803 A     11/2011

(Continued)

OTHER PUBLICATIONS

International Search Report and Written Opinion dated Jun. 9, 2020, from PCT/JP2020/009404, 9 sheets.

(Continued)

*Primary Examiner* — Cao H Nguyen
(74) *Attorney, Agent, or Firm* — Katten Muchin Rosenman LLP

(57) ABSTRACT

An information processing device 200 generates a home screen for allowing a user to select an application to be executed. The information processing device 200 causes a display device to display the generated home screen. The information processing device 200 displays an array of a plurality of icons on the home screen. The plurality of icons represent a plurality of pieces of content related to one application and display different pieces of content.

8 Claims, 5 Drawing Sheets

(56) References Cited

U.S. PATENT DOCUMENTS

2011/0145764 A1\* 6/2011 Higuchi ............... G06F 3/0482
                                                715/835
2015/0248204 A1\* 9/2015 Morita ............... H04N 21/4782
                                                715/802

FOREIGN PATENT DOCUMENTS

| JP | 2012155506 A  | 8/2012  |
|----|---------------|---------|
| JP | 2013248292 A  | 12/2013 |
| JP | 2014132425 A  | 7/2014  |
| JP | 2015016104 A  | 1/2015  |
| JP | 2016504644 A  | 2/2016  |
| JP | 2016504646 A  | 2/2016  |
| WO | 2013111245 A1 | 8/2013  |

OTHER PUBLICATIONS

Notice of Reasons for Refusal dated May 24, 2022, from Japanese Application No. 2019-044815, 5 sheets.

\* cited by examiner

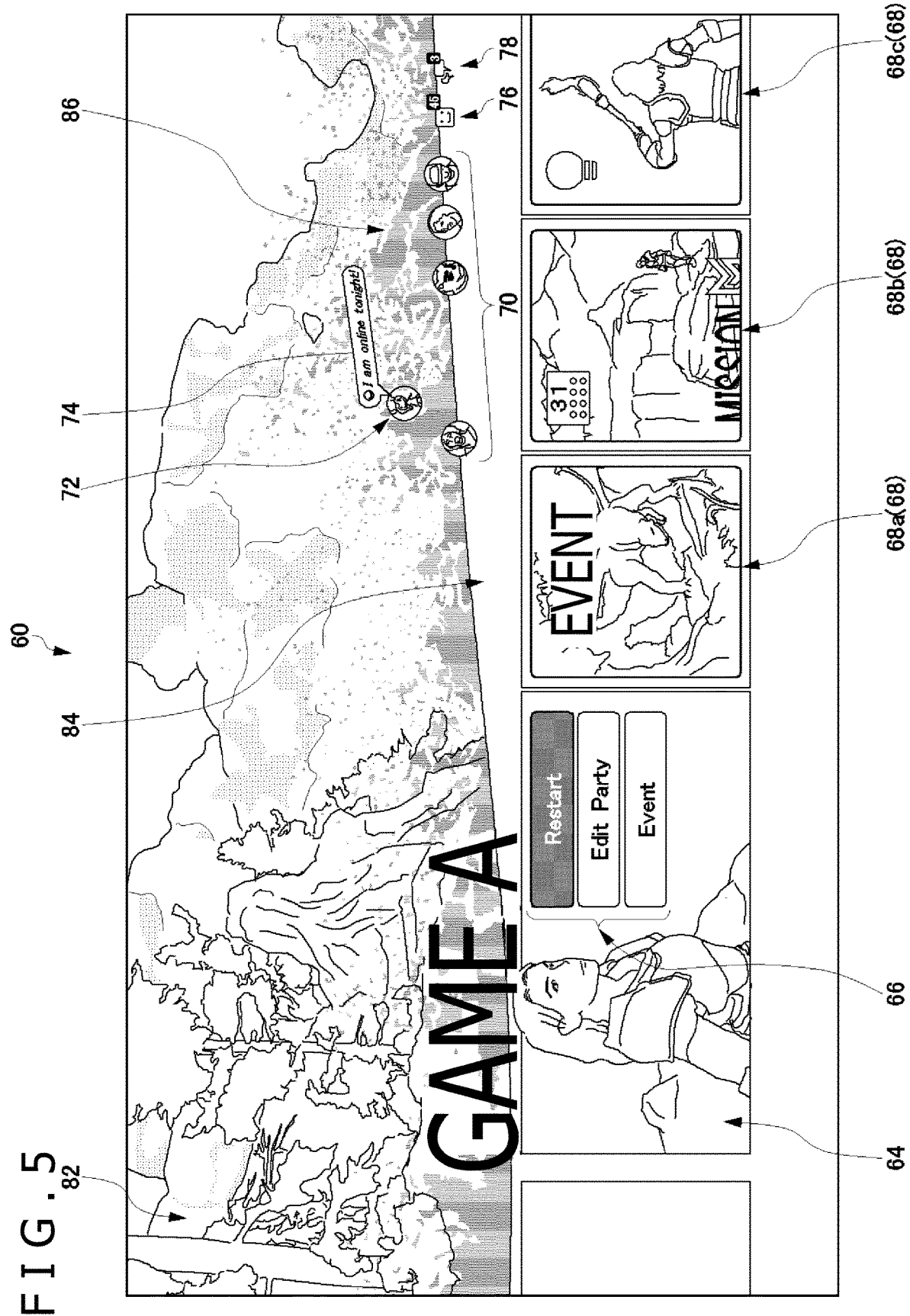

INFORMATION PROCESSING DEVICE, INFORMATION PROCESSING METHOD, AND COMPUTER PROGRAM

TECHNICAL FIELD

The present invention relates to a data processing technology, and more particularly, to an information processing device, an information processing method, and a computer program.

BACKGROUND ART

Information processing devices capable of executing various applications, such as game applications, video players, and web browsers, are widely used. Proposed in PTL 1 below is a home screen for allowing a user to select an application to be executed.

CITATION LIST

Patent Literature

[PTL 1]
JP 2016-504644T

SUMMARY

Technical Problem

In recent years, various pieces of content (e.g., events and missions in a game and video content uploaded to a web site) can be played or viewed in an application. Under these circumstances, it is demanded that the home screen of an information processing device provide increased user convenience.

The present invention has been made in view of the above circumstances. An object of the present invention is to enable a home screen of an information processing device to provide increased user convenience.

Solution to Problem

In order to solve the above problem, according to a mode of the present invention, there is provided an information processing device including a generation section and an output section. The generation section generates a home screen for allowing a user to select an application to be executed. The output section displays the home screen generated by the generation section. The generation section arranges a plurality of icons on the home screen. The plurality of icons represent a plurality of pieces of content related to one application and display different pieces of content.

According to another mode of the present invention, there is provided an information processing method including the steps of: by an information processing device, generating a home screen for allowing a user to select an application to be executed; and displaying the home screen generated in the step of generating. In the step of generating, the home screen displays a plurality of icons that represent a plurality of pieces of content related to one application and that display different pieces of content.

It should be noted that any combinations of the above-mentioned components and any conversions of expressions of the present invention between, for example, systems, computer programs, and recording media storing readable computer programs are also effective as the modes of the present invention.

Advantageous Effect of Invention

The present invention enables a home screen of an information processing device to provide increased user convenience.

BRIEF DESCRIPTION OF DRAWINGS

FIG. 5 is a diagram illustrating a modification of the home screen.

DESCRIPTION OF EMBODIMENT

An information processing device (a later-described information processing device 200) according to an embodiment displays a home screen as an initial screen, for example, upon startup and game interruption. The home screen is a screen (in other words, a user interface) that allows a user to select an application to be executed from among a plurality of applications executable by the information processing device.

The home screen according to the embodiment displays an array of a plurality of icons. The plurality of icons represent a plurality of pieces of content related to at least one of a plurality of applications executable by the information processing device, and display different pieces of content. Therefore, various ways to enjoy an application (e.g., a recommended in-game section (mission, etc.), video content, or music content) can be proposed to the user. Further, it is possible to prompt the user to use an application.

Figure 1:
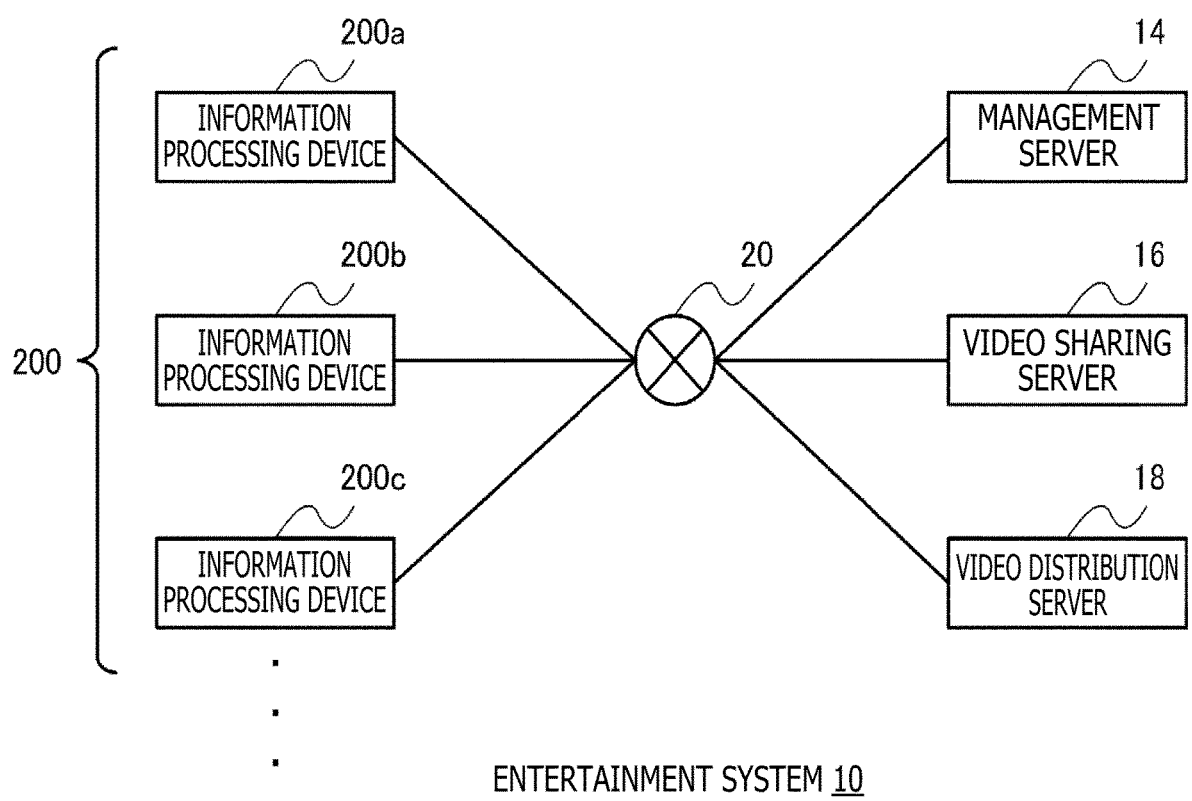
FIG. 1 is a diagram illustrating a configuration of an entertainment system according to an embodiment of the present invention.

FIG. 1 illustrates a configuration of an entertainment system 10 according to the embodiment. The entertainment system 10 includes a plurality of units of the information processing device 200, a management server 14, a video sharing server 16, and a video distribution server 18. These devices are connected through a communication network 20 including, for example, a LAN (Local Area Network), a WAN (Wide Area Network), and the Internet.

The plurality of units of the information processing device 200 include an information processing device 200a, an information processing device 200b, and an information processing device 200c, which are operated by different users. The information processing device 200 according to the embodiment is assumed to be a stationary game console. However, as a modification, the information processing device 200 may be, for example, a portable game console, a PC (Personal Computer), a smartphone, or a tablet terminal.

The management server 14 stores data regarding executions of applications in the plurality of units of the information processing device 200. The data regarding the executions of applications includes, for example, a game progress, a play history, and a video/music reproduction history.

Further, the management server 14 manages a predetermined online service that a plurality of users (the plurality of units of the information processing device 200) can log in to, and manages the login status of each user of the information processing device 200. Further, the management server 14 manages friends registered by each user of the information processing device 200. The management server 14 mediates the exchange of game information and messages during a play between the plurality of units of the information processing device 200 used by the plurality of users registered as friends.

The video sharing server 16 provides a video sharing service (for the use of a video posting site and a video sharing site) that allows a large number of unspecified users to share and view video content posted by a large number of unspecified users. The video sharing server 16 according to the embodiment also provides a music content sharing service.

The video distribution server 18 provides a video distribution service (referred to also as a "video on-demand service") that allows viewers to view various pieces of video content at a desired time. The video distribution server 18 according to the embodiment also provides a music distribution service that allows listeners to listen to various pieces of music content at a desired time.

Figure 2:
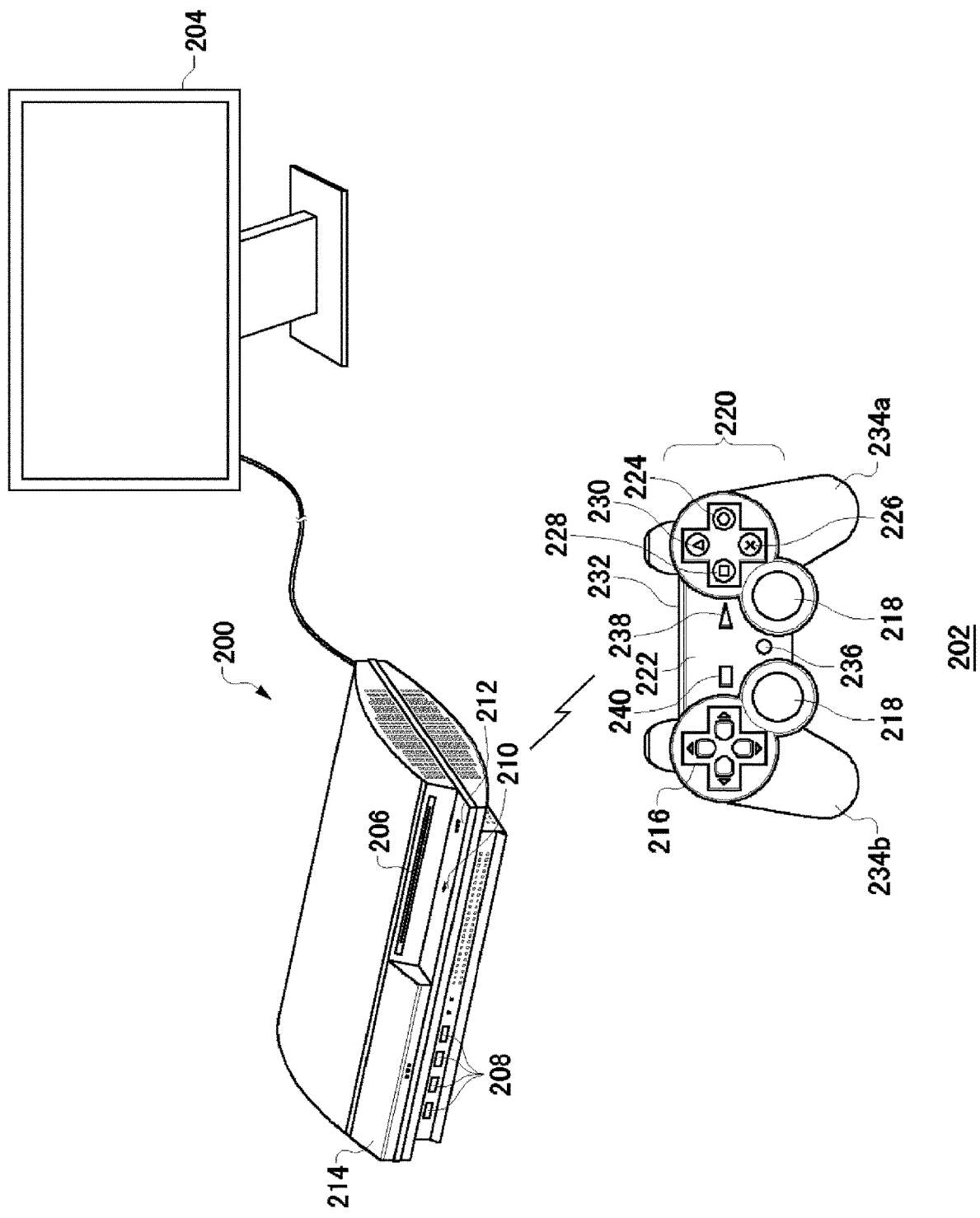
FIG. 2 illustrates an external configuration of an information processing device depicted in FIG. 1.

FIG. 2 illustrates an external configuration of the information processing device 200 depicted in FIG. 1. The information processing device 200 is connected to a controller 202 and a television monitor 204. The information processing device 200 is capable, for example, of executing a game, creating and editing electronic mail, browsing a web page, and reproducing video and music. The controller 202 is wirelessly connected to the information processing device 200. The television monitor 204 is connected to the information processing device 200, and used not only to display, for example, a game screen, a web page, and a movie, but also to output a sound. It should be noted that, although not depicted in FIG. 2, the information processing device 200 is wiredly or wirelessly connected to a router or other communication device in order to establish a connection to the Internet.

The information processing device 200 includes, for example, a disk insertion slot 206, and USB (Universal Serial Bus) connection terminals 208. The disk insertion slot 206 accepts a 12-cm-diameter optical disk. An optical disk, such as a BD (Blu-ray Disc), a DVD-ROM (Digital Versatile Disc-Read-Only Memory), or a CD (Compact Disc)-ROM, can be inserted into the disk insertion slot 206. A touch sensor 210 is a sensor for disk removal. A touch sensor 212 is a sensor for turning power on/off. Although not depicted, mounted on the rear surface of the information processing device 200 are, for example, a power switch, an audio/video output terminal, an optical digital output terminal, an AC (Alternating Current) power input terminal, a LAN port, and an HDMI (High-Definition Multimedia Interface) terminal (HDMI is a registered trademark). Additionally, the information processing device 200 may include an IEEE (Institute of Electrical and Electronics Engineers) 1394 terminal in order to establish communication based on the IEEE 1394 standard.

The information processing device 200 also includes a multimedia slot. A multimedia slot case 214 is a cover member and, although not depicted in FIG. 2, is constructed so that the multimedia slot is exposed when the multimedia slot case 214 is open.

The information processing device 200 performs various processes, for example, for executing a game, creating, editing, and receiving electronic mail, and browsing a web page in accordance with an application program for a game, electronic mail, or a web browser and with a user instruction received from the controller 202. The application program may be loaded from various types of recording media including an optical disk, such as a CD-ROM, a DVD-ROM, or a BD, a hard disk drive, and a semiconductor memory, or may be downloaded through various types of transmission media such as a LAN and a CATV (Cable Television) line.

In addition to being able, for example, to execute a game, create, edit, and receive electronic mail, and browse a web page in accordance with an application program, the information processing device 200 is able to reproduce (decode) video and audio data, such as audio data recorded on a CD and movie data recorded on a DVD or a BD. Further, the information processing device 200 is able to operate based on various other types of application programs. It should be noted that a driver program for reproducing data recorded on a DVD or a BD is stored, for example, in a hard disk drive 334 built in the information processing device 200.

The controller 202 is driven by an undepicted battery, and provided with a plurality of buttons and keys for performing operation input to cause the progress of a game or other application. When the user operates a button or key on the controller 202, such an operation input is wiredly or wirelessly transmitted to the information processing device 200.

The controller 202 includes direction keys 216, analog sticks 218, and four different operation buttons 220. The direction keys 216, the analog sticks 218, and the operation buttons 220 are input sections disposed on a housing upper surface 222. The four different buttons 224, 226, 228, and 230 are marked with different symbols in different colors for distinguishing them from each other. More specifically, a circle (○) button 224 is marked with a red circle, a cross (x) button 226 with a blue cross, a square (□) button 228 with a purple square, and a triangle (△) button 230 with a green triangle. Although not depicted in FIG. 2, a plurality of LEDs (Light-Emitting Diodes) are mounted on a housing rear surface 232 of the controller 202.

The user operates the controller 202 while gripping a left grip section 234b with the left hand of the user and gripping a right grip section 234a with the right hand of the user. The direction keys 216, the analog sticks 218, and the operation buttons 220 are disposed on the housing upper surface 222 in such a manner that they can be operated by the user while the user grips the left grip section 234b and the right grip section 234a.

A button with an LED (hereinafter referred to as the "PS button 236") is also mounted on the housing upper surface 222. The PS button 236 is used to switch between the home screen and another screen in the information processing device 200 according to the embodiment. Further, the PS button 236 has a function, for example, of changing the light-emitting state of the LED to notify the user of incoming mail or indicate the charging state of the battery of the controller 202. For example, the LED glows red while the battery is being recharged, glows green at the end of charging, and blinks red when a remaining battery level is low. Further, a select button 240 and a start button 238 are also disposed on the housing upper surface 222 and configured to perform predetermined functions, respectively.

The direction keys 216 include four different direction indicator keys that are named "Up," "Down," "Left," and "Right," respectively. The direction indicator keys are operated by the user when, for example, the user moves an on-screen game character of a game upward, downward, leftward, or rightward, moves a text input cursor upward, downward, leftward, or rightward on an electronic mail creation screen, scrolls a page while browsing a web page, or moves an on-screen cursor upward, downward, leftward, or rightward. It should be noted that the "Up," "Down," "Left," and "Right" direction indicator keys are used not only for indicating the upward, downward, leftward, and rightward directions, but also for indicating diagonal directions. For example, the user can indicate, to the information processing device 200, an upper right diagonal direction by simultaneously pressing the "Up" and "Right" direction indicator keys. The same holds true for the other direction indicator keys. For example, the user can indicate, to the information processing device 200, a lower left diagonal direction by simultaneously pressing the "Down" and "Left" direction indicator keys.

Different functions are assigned to the operation buttons 220 by an application program. In the embodiment, a function of displaying a menu is assigned to the triangle (Δ) button 230, a function of cancelling a selected option or causing a return is assigned to the circle (○) button 224, a function of applying a selected option is assigned to the cross (x) button 226, and a function of displaying or non-displaying, for example, a table of contents is assigned to the square (□) button 228. An alternative is to assign a function of applying a selected option to the circle (○) button 224 and assign a function, for example, of cancelling a selected option, as a modification.

The analog sticks 218 include a rotary operator and variable analog value output means. The rotary operator is able to perform a tilting operation in a desired direction around a rotation fulcrum of an operation shaft. The variable analog value output means outputs a variable analog value in accordance with the operation of the rotary operator. The rotary operator is attached to the tip of the operation shaft, which is disposed so that it is returned to its neutral position by an elastic member. The rotary operator keeps its position (reference position) in an upright state (in a non-tilted state) when no tilting operation is performed by the user. The variable analog value output means includes, for example, a variable resistance element. The variable resistance element varies its resistance in accordance with the operation of the rotary operator. When the rotary operator included in the analog sticks 218 is used to perform a tilting operation, the controller 202 detects XY coordinate values based on the amount and direction of tilting from the reference position, and transmits the detected XY coordinate values to the information processing device 200 as an operation output signal.

Figure 3:
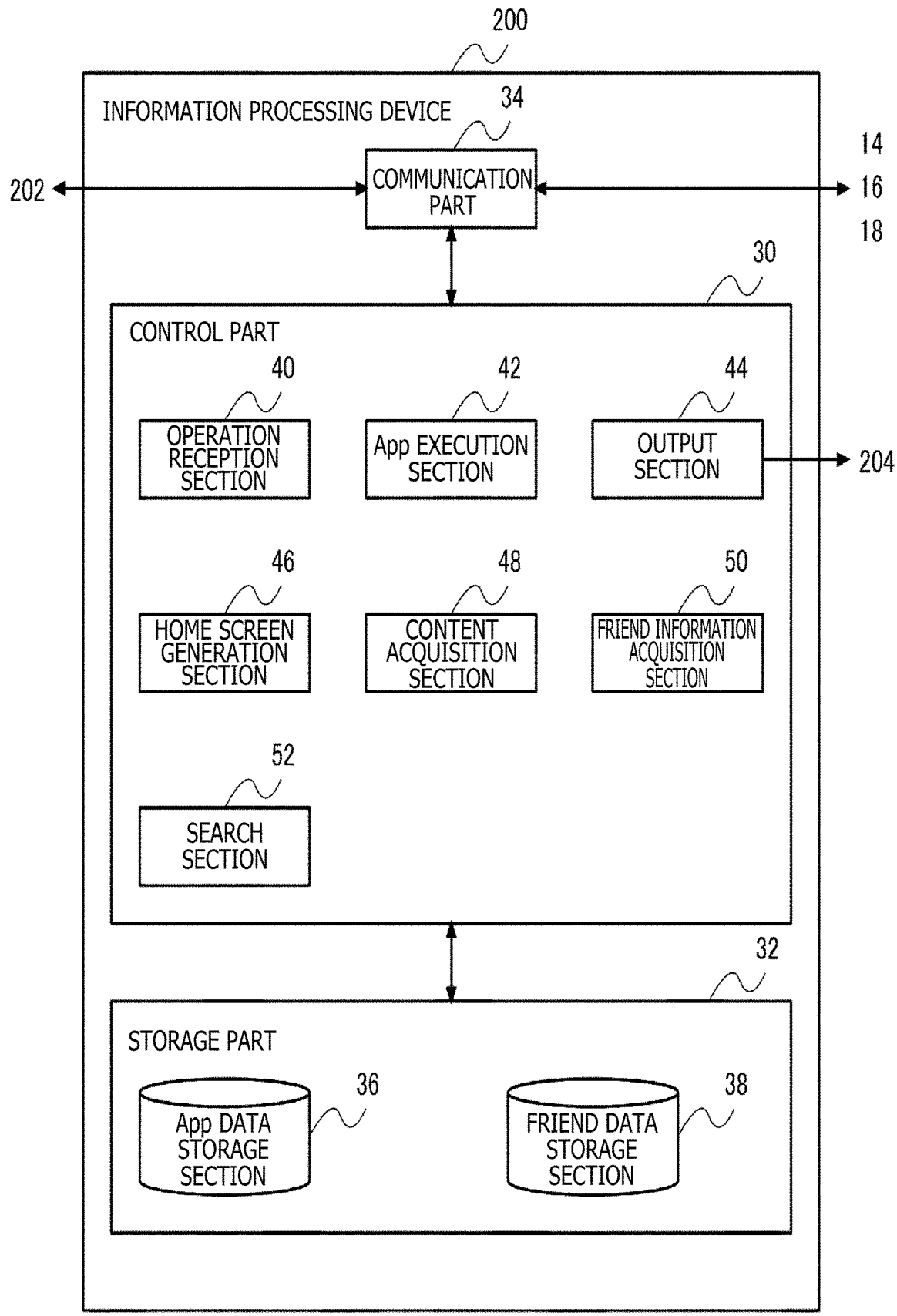
FIG. 3 is a block diagram illustrating functional blocks of the information processing device depicted in FIG. 1.

FIG. 3 is a block diagram illustrating functional blocks of the information processing device 200 depicted in FIG. 1. A plurality of functional blocks depicted in the block diagram can be formed by hardware, such as a circuit block, a memory, or another LSI (Large-Scale Integration), and are implemented by software, such as a program loaded into a memory and executed by a CPU (Central Processing Unit). Therefore, it will be understood by those skilled in the art that the functional blocks may be variously implemented by hardware only, by software only, or by a combination of hardware and software. The method of implementing the functional blocks is not specifically limited.

The information processing device 200 includes a control part 30, a storage part 32, and a communication part 34. The control part 30 performs various information processes to control the operation of the information processing device 200. The storage part 32 stores data that is to be referenced or updated by the control part 30. The communication part 34 communicates with external devices (e.g., the controller 202, the management server 14, the video sharing server 16, and the video distribution server 18) in accordance with a predetermined communication protocol. The control part 30 transmits and receives data to and from the external devices through the communication part 34.

The storage part 32 includes an App data storage section 36 and a friend data storage section 38. The App data storage section 36 stores data regarding a plurality of applications executable by the information processing device 200 (the data regarding the applications is hereinafter referred to also as the "App data"). The plurality of applications include, for example, (1) a plurality of game applications having various titles, (2) a client application for using a video sharing service (including a music sharing service) (this client application is hereinafter referred to also as the "video sharing client App"), and (3) a client application for using a video distribution service (including a music distribution service) (this client application is hereinafter referred to also as the "video distribution client App").

The App data includes, for example, (1) an executable file for executing, reproducing, or displaying an application and (2) data regarding the play, reproduction history, and viewing history of an application. The data indicating the play of an application may include data indicating the progress of a game, data indicating another user (e.g., a friend) participating, for example, in a cooperative or competitive play, and manually or automatically saved data.

The friend data storage section 38 stores information regarding friends registered by the user. Data regarding the friends includes, for example, identification information regarding the friends, thumbnails representing the friends (video or still images pre-registered by the friends in the embodiment), and messages transmitted from the friends.

The control part 30 includes an operation reception section 40, an App execution section 42, an output section 44, a home screen generation section 46, a content acquisition section 48, a friend information acquisition section 50, and a search section 52. At least some of these functional blocks may be implemented as modules of a computer program (e.g., the OS (Operating System) or user interface program of the information processing device 200). The computer program may be installed in the storage part 12. The CPU and a GPU (Graphics Processing Unit) included in the information processing device 200 may exercise the functions of the functional blocks by loading the computer program into a main memory and executing the loaded computer program.

The operation reception section 40 receives a signal that is indicative of an operation inputted by the user to the controller 202 and is transmitted from the controller 202.

In a case where the user selects an application to be executed, the App execution section 42 reads the relevant App data from the App data storage section 36 and executes the read App data. For example, the App execution section 42 generates a game screen indicative of the progress and result of a game selected by the user by executing the App data regarding the game. In a case where a predetermined operation is inputted during the execution of an application (i.e., during the reproduction of various pieces of content in an application), the App execution section 42 suspends the execution of the application. It is assumed that the above-mentioned predetermined operation in the embodiment is pressing the PS button 236 on the controller 202.

The output section 44 outputs the result of App data execution by the App execution section 42 to the television monitor 204, and causes the television monitor 204 to display the result of App data execution. For example, the output section 44 outputs, to the television monitor 204, data regarding game screens and content reproduction screens generated by the App execution section 42, and causes television monitor 204 to display the game screens and the content reproduction screens. Further, the output section 44 outputs, to the television monitor 204, data regarding a home screen generated by the later-described home screen generation section 46, and causes the television monitor 204 to display the home screen.

The home screen generation section 46 generates data regarding a home screen of the information processing device 200. The home screen generation section 46 causes the home screen to display an array of a plurality of icons (referred to also as the "thumbnails") that represent different applications (such as games having different titles) or different pieces of content (such as different pieces of music content and video content and different missions).

The content acquisition section 48 acquires video content or music content from the video sharing server 16 when the home screen is displayed or in response to a user operation. Further, the content acquisition section 48 acquires video content or music content from the video distribution server 18 when the home screen is displayed or in response to a user operation.

The friend information acquisition section 50 acquires information regarding a friend of the user from the friend information acquisition section 50. The information regarding the friend includes, for example, information regarding a game currently played by the friend (e.g., missions in a game) and messages transmitted from the friend (from the information processing device 200 operated by the friend). The search section 52 performs a search process on the App data stored in the App data storage section 36.

Operations performed by the information processing device 200 having the above-described configuration will now be described.

In a case where a home screen display condition is satisfied in the information processing device 200, the home screen generation section 46 generates the home screen of the information processing device 200, and the content acquisition section 48 causes the television monitor 204 to display the home screen. The home screen display condition is satisfied in a case where (1) the information processing device 200 is turned on, (2) the information processing device 200 recovers from a standby mode, or (3) the execution of an application is suspended by a predetermined operation (the press of the PS button 236 in the embodiment).

Figure 4:
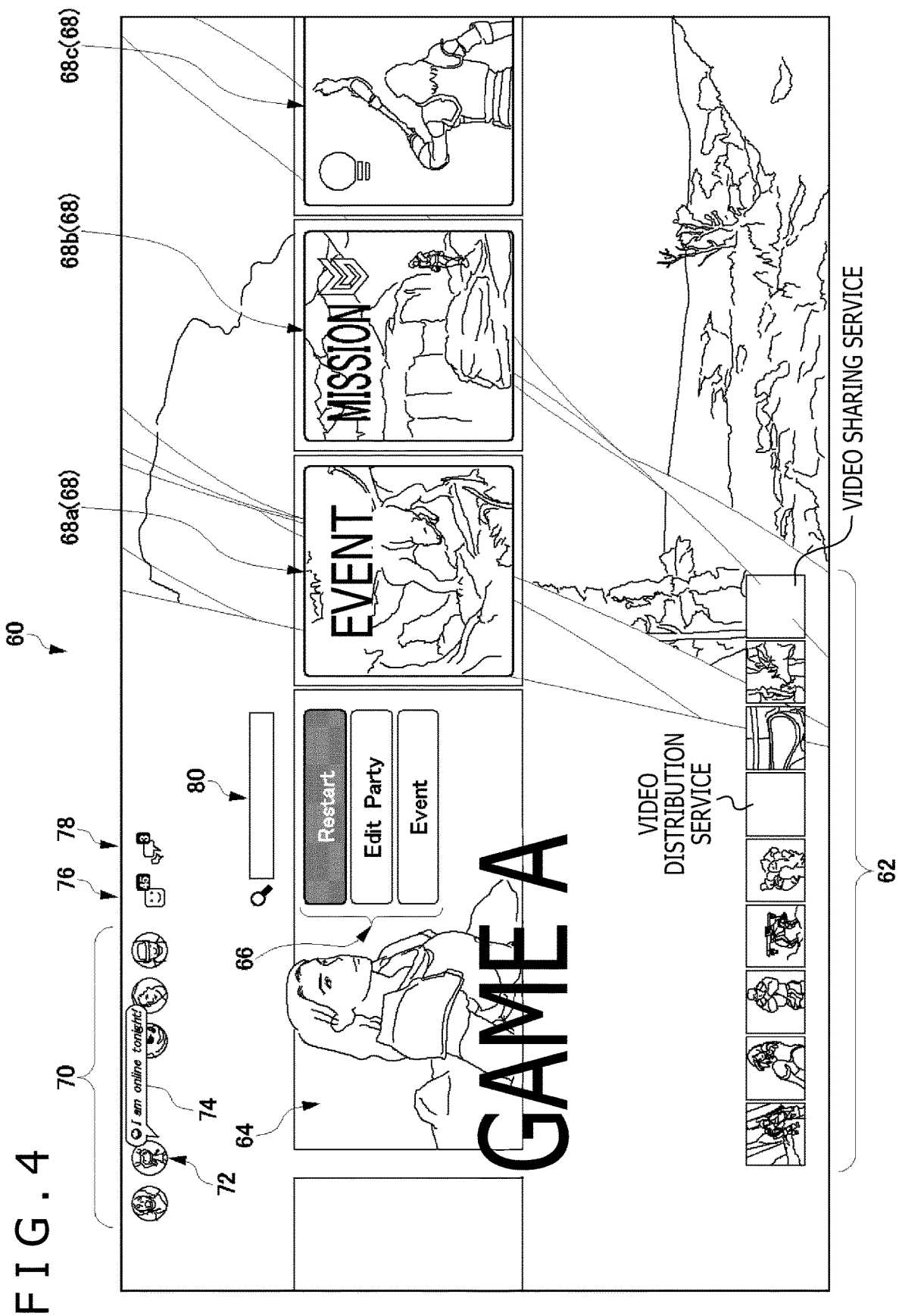
FIG. 4 is a diagram illustrating an example of a home screen.

FIG. 4 illustrates an example of the home screen. The home screen 60 includes a plurality of App thumbnails 62. The plurality of thumbnails 62 are thumbnail images representing a plurality of applications executable by the information processing device 200, such as game applications installed in the information processing device 200, video sharing client Apps, and video distribution client Apps.

The following describes how content icons are displayed on the home screen 60. The home screen 60 includes a plurality of icons (content icons 68 depicted in FIG. 4) that represent a plurality of pieces of content regarding at least one application among a plurality of applications executable by the information processing device 200 (this application is herein referred to also as the "selected App"), and display different pieces of content.

The selected App in FIG. 4 is "game A." The selected App in the embodiment is (1) the last-executed application at the time when the home screen 60 is displayed, (2) an application whose execution is suspended by the press of the PS button 236, or (3) an application represented by an App thumbnail 62 selected by the user from among a plurality of App thumbnails 62. Selected App information 64 is an area for displaying the name, image, and a quick menu 66 of the selected App. The quick menu 66 will be described later.

The home screen 60 includes a plurality of content icons 68 regarding the selected App (a content icon 68a, a content icon 68b, and a content icon 68c in FIG. 4). The content icon 68a is an icon representing an event in the selected App (e.g., a holiday event). When a user operation is inputted to select the content icon 68a on the home screen 60 (when, for example, the cross (x) button 226 is pressed after the content icon 68a is focused), the App execution section 42 generates an event screen by executing event content in the selected App, which is represented by the content icon 68a. The output section 44 causes the television monitor 204 to display the event screen.

The content icon 68b is an icon representing a mission (or a quest) that is a piece of content executed or reproduced in the selected App. When a user operation is inputted to select the content icon 68b on the home screen 60, the App execution section 42 generates a mission screen by executing mission content in the selected App, which is represented by the content icon 68b. The output section 44 causes the television monitor 204 to display the mission screen.

The content icon 68c is an icon representing a link to tips information regarding the play of the selected App. When a user operation is inputted to select the content icon 68c on the home screen 60, the App execution section 42 generates a screen (referred to also as the "tips screen") for presenting tips on the selected App (e.g., a way of capturing a specific mission). The output section 44 causes the television monitor 204 to display the tips screen.

The plurality of content icons 68 include an icon representing content fit for a user's play of the selected App. For example, according to the history of the user's play of the selected App, which is stored in the App data storage section 36, and to the level (e.g., character level or play skill) of the user, the home screen generation section 46 may select, from among a plurality of events held in relation to the selected App, an event suitable for the user or an event in which the user can participate. The home screen generation section 46 may cause the home screen 60 to display the content icon 68a that is representative of and linked to the selected event.

Further, according to the history of the user's play of the selected App and to the level of the user, the home screen generation section 46 may select, from among a plurality of missions (quests) of the selected App, a mission suitable for the user or a mission in which the user can participate. For example, in a case where the sixth mission is cleared by the user, the home screen generation section 46 may select the seventh mission. The home screen generation section 46 may cause the home screen 60 to display the content icon 68b that is representative of and linked to the selected mission.

Further, the home screen generation section 46 may cause the home screen 60 to display the content icon 68c that is linked to a capture video related to the above-mentioned selected event or mission. In a case where the content icon 68c is selected, the content acquisition section 48 may acquire, from the video sharing server 16 or the video distribution server 18, a capture video related to an event or mission represented by the content icon 68c. The App execution section 42 may reproduce a capture video acquired by the content acquisition section 48. The output section 44 may cause the television monitor 204 to display the tips screen that indicates the result of reproduction of the capture video.

It should be noted that the content icon 68c may be statically linked to tips information (e.g., capture information regarding the next mission) that is fit for the user's play (e.g., an accomplished mission) and prepared, for example, by the developer of the selected App. In such a case, the content acquisition section 48 may acquire the tips information (e.g., video content) linked to the content icon 68c from the video sharing server 16, the video distribution server 18, or other external device.

Alternatively, in a case where the content icon 68c is selected, the content acquisition section 48 may identify the keyword of the tips information according to the user's play. For example, in a case where missions up to the ninth mission of the selected App are cleared by the user, the content acquisition section 48 may identify a word indicative of the tenth mission of the selected App as the keyword of the tips information. The content acquisition section 48 may search the video sharing server 16 (or the video distribution server 18) for such a keyword and may acquire video content matching the keyword from the video sharing server 16 (or the video distribution server 18) as the tips information.

FIG. 4 illustrates an example in which a game application is the selected App. In a certain case, however, the video sharing client App or the video distribution client App may be the selected App. In such a case, the content acquisition section 48 may acquire, from the video sharing server 16 (or the video distribution server 18), a plurality of pieces of video content (or music content) suitable for various kinds of attribute information regarding the user, which is stored in the storage part 32. The attribute information regarding the user may include a game play description and a video viewing history that are stored in the App data storage section 36 and may include information regarding, for example, the age and preferences of the user.

The home screen generation section 46 may cause the home screen 60 to display, as the content icons 68, an array of a plurality of icons representing a plurality of pieces of video content (or music content) acquired by the content acquisition section 48. For example, the content acquisition section 48 may acquire information regarding videos A, B, and C, which are related to videos viewed by the user and may cause the home screen 60 to display an array of the content icon 68a, the content icon 68b, and the content icon 68c, which represent videos A, B, and C, respectively.

The information processing device 200 according to the embodiment allows the user to select an execution target on the basis of individual pieces of content included in an application (i.e., on the basis of individual plays or reproductions) without leaving the home screen 60 from which various applications are selectable (without switching to another screen). This makes it possible to propose to the user various pieces of content executable in individual applications and to provide the user with a convenience of executing and reproducing a desired piece of content by performing a simple operation.

Further, the content icons 68 on the home screen 60 are used to execute content fit for the user's play of the selected App. This makes it possible to present the user with content that the user is highly likely to play, and thus implement the home screen 60 that provides increased convenience.

The quick menu 66 will now be described. The home screen generation section 46 causes the home screen 60 to additionally display the quick menu 66 in association with the selected App. The quick menu 66 is an icon that is different from the plurality of content icons 68 and representative of a common menu item executable with respect to a plurality of applications. In the embodiment, the home screen generation section 46 arranges a plurality of quick menus 66 in the area of the selected App information 64.

The plurality of quick menus 66 may include, for example, a menu for resuming the execution of the selected App (displaying a screen for executing the selected App) ("Restart" in FIG. 4), a menu for displaying a room for chatting with another user who has activated the selected App ("Edit Party" in FIG. 4), and a menu for displaying event information regarding the selected App ("Event" in FIG. 4). Further, the plurality of quick menus 66 may include a menu for displaying information regarding trophies related to the selected App (indices indicating, for example, the degree of game play), a menu for displaying the user's play of the selected App (e.g., play time), and a menu for displaying a friend's play of the selected App.

In a case where a specific quick menu 66 is selected from among the plurality of quick menus 66, the App execution section 42 executes the program of the selected App so as to perform a process indicated by the selected quick menu 66. By selecting a quick menu 66, the user is able to cause the selected App to perform a desired one of typical processes common to a plurality of applications.

The home screen generation section 46 sets an appearance associated with the selected App (i.e., dependent on the selected App) for the plurality of content icons 68, and sets an appearance independent of a specific application (e.g., the selected App) for the quick menus 66. The appearance associated with the selected App may include an image or text unique to the selected App. Meanwhile, it can be said that the appearance independent of a specific application is common to a plurality of applications and remains the same irrespective of a selected application. When the appearance of the quick menus 66 is common to a plurality of applications, it is possible to reduce the burden on the user in a case where the user distinguishes between a plurality of icons in order to let an application perform a typical process.

It should be noted that image data representing the appearance of the content icons 68 may be stored in the App data storage section 36 on the basis of individual applications. Meanwhile, image data representing the appearance of the quick menus 66 may be stored in the storage part 32 as system data regarding the information processing device 200, that is, as data usable in common with a plurality of applications.

Displaying friend information on the home screen 60 will now be described. The friend information acquisition section 50 acquires, from the management server 14, information regarding the friends of the user during the display of the home screen 60 or on a periodic basis. Here, the friend information is information regarding online friends, or more specifically, information regarding friends who have logged in a predetermined online service. The home screen generation section 46 causes the home screen 60 to display the friend information acquired from the friend information acquisition section 50. The friend information displayed on the home screen 60 includes one or more friend thumbnails 70, a message 74, friend statistical information 76, and message statistical information 78.

The home screen generation section 46 acquires, from the friend data storage section 38, the thumbnail images of online friends whose intimacy is equal to or greater than a predetermined threshold value (these intimate friends are hereinafter referred to as "steady friends"), and causes the home screen 60 to display the acquired thumbnail images as the friend thumbnails 70. In FIG. 4, the thumbnails 70 of five friends are displayed. Further, in a case where a message transmitted from a steady friend is acquired by the friend information acquisition section 50, the home screen generation section 46 associates the acquired message with a friend thumbnail 70 (a friend thumbnail 72 in FIG. 4) representing the steady friend at the message transmitting end, and causes the home screen 60 to display a message 74 that is an image indicating the contents of the acquired message.

The home screen generation section 46 causes the friend statistical information 76 to display the total number of online friends. Further, the home screen generation section 46 causes the message statistical information 78 to display the number of unread messages received from online friends and offline friends (all the friends of the user).

The home screen generation section 46 causes the home screen 60 to display a focus object (e.g., a frame image for focusing) that prompts the user to focus on a desired icon or thumbnail as a selection operation target. In a case where a focus on the home screen 60 is switched from a first content icon 68 related to an application to a second content icon 68 related to the same application, the home screen generation section 46 changes a display target on the home screen 60 from information regarding a friend playing content represented by the first content icon 68 to information regarding a friend playing content represented by the second content icon 68.

For example, in a case where the content icon 68*a* representing a specific event in game A is focused, the home screen generation section 46 causes the home screen 60 to display the friend thumbnail 70, the friend statistical information 76, and the message statistical information 78 regarding a friend playing the specific event. In a case where the focus is switched, in the above instance, to the content icon 68*b* representing a specific mission in game A, the home screen generation section 46 switches to a home screen 60 that displays the friend thumbnail 70, the friend statistical information 76, and the message statistical information 78 regarding a friend playing the specific mission.

The information processing device 200 according to the embodiment changes the friend information on the home screen 60 on the basis of individual pieces of content included in an application (i.e., on the basis of individual plays or reproductions). This makes it possible to assist the user in content selection, and thus implement the home screen 60 that provides increased convenience.

Further, the home screen generation section 46 causes the home screen 60 to display a search window 80. The embodiment is configured such that, in a case where a search keyword is inputted to the search window 80, the search section 52 searches selected App data stored in the App data storage section 36 for data matching the search keyword. The home screen generation section 46 generates the home screen 60 including the result of the search or generates a search result screen that replaces the home screen 60 to display the search result.

The output section 44 causes the television monitor 204 to display the home screen 60 including the search result or display the search result screen. It is possible to assist the user in specifying a proper search keyword by causing the home screen 60 to present the user with the level of content in the selected App.

As a modification, the search section 52 may search the whole data regarding a plurality of applications executable by the information processing device 200. As another modification, in a case where no data matches the search keyword (i.e., the number of search hits is zero), the home screen generation section 46 may cause the home screen 60 or the search result screen to display the search result (a hit count of zero) and an advertisement regarding the selected App supplied in advance or acquired in real time from the management server 14. It should be noted that the advertisement may be regarding a plurality of applications executable by the information processing device 200.

The present invention has been described in terms of the embodiment. The embodiment is illustrative and not restrictive. Persons of skill in the art will appreciate that the combination of components or processes described in conjunction with the embodiment may be variously modified, and further that such modifications are also within the scope of the present invention.

A first modification will now be described. In a case where new information regarding a friend is acquired by the friend information acquisition section 50 while the home screen 60 including friend information is displayed, the home screen generation section 46 may operate an icon representative of the friend (the friend thumbnail 70 in the present modification) on the home screen 60, and additionally operate the background of the home screen 60. For example, the home screen generation section 46 may sequentially generate images of a plurality of home screens 60 that differ in the position of the icon representative of the friend whose new information is acquired and also differ in the mode of the background, and thus operate, in the video image of the home screen 60, both the background and the icon representative of the friend whose new information is acquired.

FIG. 5 illustrates an example of the home screen 60 according to the modification. Although not depicted, the home screen 60 according to the modification may include the App thumbnails 62, as is the case with the home screen 60 according to the embodiment. The home screen generation section 46 displays a wave image 84 as a part of the background 82 of the home screen 60. Under normal conditions, the home screen generation section 46 arranges a plurality of friend thumbnails 70 at an edge of the wave image 84 (i.e., near the surface of water), and operates the wave image 84 in such a manner as to represent low rippling waves.

In a case where new information (a new message in FIG. 5) regarding a steady friend is acquired by the friend information acquisition section 50, the home screen generation section 46 causes a friend thumbnail 70 (the friend thumbnail 72 in FIG. 5) representative of the steady friend to move (jump) upward over the screen, and displays the message 74 in association with the friend thumbnail 72. Additionally, the home screen generation section 46 operates the wave image 84 in such a manner as to represent high rippling waves and causes the home screen 60 to display a particle image 86 of splashing waves. That is, the home screen generation section 46 operates so that the wave image 84 and the friend thumbnail 70 representative of a friend whose new information is acquired simultaneously change to a mode different from a normal one.

It should be noted that the new information regarding a friend may be regarding the progress of a game played by the friend (e.g., the tenth mission is cleared). Further, the new information regarding a friend may indicate that a new trophy (an index indicative of a speedrun, for example, in a game) regarding the selected App is won. Further, the new information regarding a friend may be regarding the viewing of video or music content by the friend (e.g., a highly evaluated piece of video content).

According to a mode of the first modification, real-time acquisition of new information regarding a friend can be reported emphatically to the user viewing the home screen 60. Further, the user can be made to become conscious of a connection to the friend and realistically feel as if the user is close to the friend. This enhances the entertainability of the entertainment system 10.

A second modification will now be described. In the embodiment, it is assumed that the friend thumbnails 70 are video or still images pre-registered by the friends. However, as a modification, the friend thumbnails 70 may be video images distributed in real time from the information processing device 200 of the friends (these video images are referred to as "live video images"). The live video images may include, for example, the result of application reproduction in the information processing device 200 of the friends (e.g., a screen of a currently played game). Further, the live video images may be video images captured by a live camera (i.e., a web camera) for capturing a video image of the friends. In short, the live video images may be video images depicting the current appearance and status of the friends.

In the second modification, the friend information acquisition section 50 may acquire, through the management server 14, the live video images streamed from the information processing device 200 of a steady friend. Each time the live video image of the steady friend is acquired, the home screen generation section 46 may generate or update the friend thumbnails 70 and arrange a friend thumbnail 70 representative of the live video image of the steady friend on the home screen 60. It should be noted that the friends may not always be easily identified in a case where, for example, the game screens of the friends are represented by the friend thumbnails 70. To cope with such a case, the home screen generation section 46 may arrange the identification information regarding the friends (e.g., the ID (Identifications) and names of the friends) in the vicinity of or in overlap with the friend thumbnails 70.

Any combinations of the above-described embodiment and modifications are also effective as embodiments of the present disclosure. New embodiments created by the combinations have the respective advantages of the combinations of the embodiment and modifications. Further, it will be understood by those skilled in the art that the functions to be exercised by individual components described in the appended claims are implemented individually or cooperatively by the components described in conjunction with the embodiment and modifications.

INDUSTRIAL APPLICABILITY

The present invention is applicable to a device for displaying a screen that allows a user to select an application to be executed.

REFERENCE SIGNS LIST

10: Entertainment system
40: Operation reception section
42: App execution section
44: Output section
46: Home screen generation section
48: Content acquisition section
50: Friend information acquisition section
52: Search section
200: Information processing device

The invention claimed is:

1. An information processing device comprising:
a generation section that generates a home screen for allowing a user to select an application to be executed; and
an output section that displays the home screen generated by the generation section,
wherein the generation section causes the home screen to display a plurality of icons, the plurality of icons representing a plurality of pieces of content related to one application and displaying different pieces of content including missions, events, and messages.

2. The information processing device according to claim 1,
wherein the plurality of icons include an icon representing content related to a user's current progress within the one application.

3. The information processing device according to claim 1,
wherein the generation section causes the home screen to additionally display a menu icon in association with the one application, the menu icon being different from the plurality of icons and representative of a common menu executable with respect to a plurality of applications.

4. The information processing device according to claim 3,
wherein the plurality of icons have an appearance associated with the one application, and
the menu icon has an appearance independent of a specific application.

5. The information processing device according to claim 1, further comprising:
an acquisition section that acquires information regarding a friend playing each of a plurality of pieces of content related to the one application,
wherein the generation section causes the home screen to additionally display the information regarding the friend, and,
in a case where a focus on the home screen is switched from a first icon related to the one application to a second icon related to the one application, the generation section changes a display target on the home screen from information regarding a friend playing content represented by the first icon to information regarding a friend playing content represented by the second icon.

6. The information processing device according to claim 1, further comprising:
an acquisition section that acquires information regarding a friend,
wherein the generation section causes the home screen to additionally display at least one icon representing at least one friend, and,
in a case where new information regarding a certain friend is acquired by the acquisition section, the generation section operates an icon representing the certain friend on the home screen, and additionally operates a background of the home screen.

7. An information processing method comprising:
by an information processing device,
generating a home screen for allowing a user to select an application to be executed; and
displaying the home screen generated in the generating,
wherein the generating causes the home screen to display a plurality of icons, the plurality of icons representing a plurality of pieces of content related to one application and displaying different pieces of content including missions, events, and messages.

8. A non-transitory computer readable medium having stored thereon a computer program for an information processing device, comprising:
- by a generation section, generating a home screen for allowing a user to select an application to be executed; and
- by an output section, displaying the home screen generated by the generating,
- wherein the generating causes the home screen to display a plurality of icons, the plurality of icons representing a plurality of pieces of content related to one application and displaying different pieces of content including missions, events, and messages.

* * * * *